United States Patent
Xiong et al.

(10) Patent No.: US 12,200,771 B2
(45) Date of Patent: Jan. 14, 2025

(54) DETERMINATION OF RNTI FOR PERFORMING RACH PROCEDURE AT CARRIER FREQUENCIES ABOVE 52.6 GHz

(71) Applicant: Intel Corporation, Santa Clara, CA (US)

(72) Inventors: Gang Xiong, Beaverton, OR (US); Alexei Davydov, Nizhny Novgorod (RU); Yingyang Li, Beijing (CN); Dae Won Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 17/527,283

(22) Filed: Nov. 16, 2021

(65) Prior Publication Data
US 2022/0095381 A1    Mar. 24, 2022

Related U.S. Application Data

(60) Provisional application No. 63/118,385, filed on Nov. 25, 2020.

(51) Int. Cl.
*H04W 74/0833* (2024.01)
*H04W 74/0836* (2024.01)

(52) U.S. Cl.
CPC ... *H04W 74/0833* (2013.01); *H04W 74/0836* (2024.01)

(58) Field of Classification Search
CPC ............. H04W 74/00; H04W 74/0833; H04W 74/0836
See application file for complete search history.

(56) References Cited

U.S. PATENT DOCUMENTS

| | | | |
|---|---|---|---|
| 2016/0330768 A1* | 11/2016 | Hu | H04W 74/0833 |
| 2018/0206272 A1* | 7/2018 | Maaref | H04L 5/0053 |
| 2019/0306923 A1* | 10/2019 | Xiong | H04J 13/0062 |
| 2020/0260497 A1* | 8/2020 | Ozturk | H04W 74/00 |
| 2021/0068162 A1* | 3/2021 | Agiwal | H04B 7/0617 |
| 2021/0112599 A1* | 4/2021 | Gao | H04W 56/00 |
| 2022/0174744 A1* | 6/2022 | Lin | H04W 74/0833 |
| 2022/0279583 A1* | 9/2022 | Yao | H04W 74/0833 |
| 2022/0279593 A1* | 9/2022 | Zheng | H04W 74/0838 |
| 2023/0319901 A1* | 10/2023 | Ozturk | H04W 74/085 370/329 |

* cited by examiner

*Primary Examiner* — Jeong S Park
(74) *Attorney, Agent, or Firm* — Schwegman Lundberg & Woessner, P.A.

(57) ABSTRACT

A user equipment (UE) configured for operation in a sixth generation (6G) network may perform a random access channel (RACH) procedure with a generation node B (gNB). The UE may encode a physical random access channel (PRACH) preamble for transmission in a PRACH occasion (RO) For carrier frequencies above 52.6 GHz, the UE may determine a Radio Network Temporary Identifier (RNTI) (i.e., either a RA-RNTI or a MsgB-RNTI) based on an index of the PRACH occasion RO index. The UE may also decode a response from the gNB that includes the RNTI. The UE may determine the RNTI based on the RO index in a time domain and the RO index in a frequency domain.

15 Claims, 8 Drawing Sheets

DETERMINATION OF RNTI FOR PERFORMING RACH PROCEDURE AT CARRIER FREQUENCIES ABOVE 52.6 GHz

PRIORITY CLAIM

This application claims the benefit of priority under 35 USC 119(e) to U.S. Provisional Patent Application Ser. No. 63/118,385, filed Nov. 25, 2020 which is incorporated herein by reference in its entirety.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments are directed to operation above a 52.6 GHz carrier frequency. Some embodiments are directed to sixth-generation (6G) network operations.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

One issue with operating above a 52.6 GHz carrier frequency is that due to the larger subcarrier spacing, the number of symbols or slots in a frame can be relatively large. This creates an issue with calculation of the Radio Network Temporary Identifier (RNTI) for performing a random access channel (RACH) procedure.

DETAILED DESCRIPTION

Figure 1A:
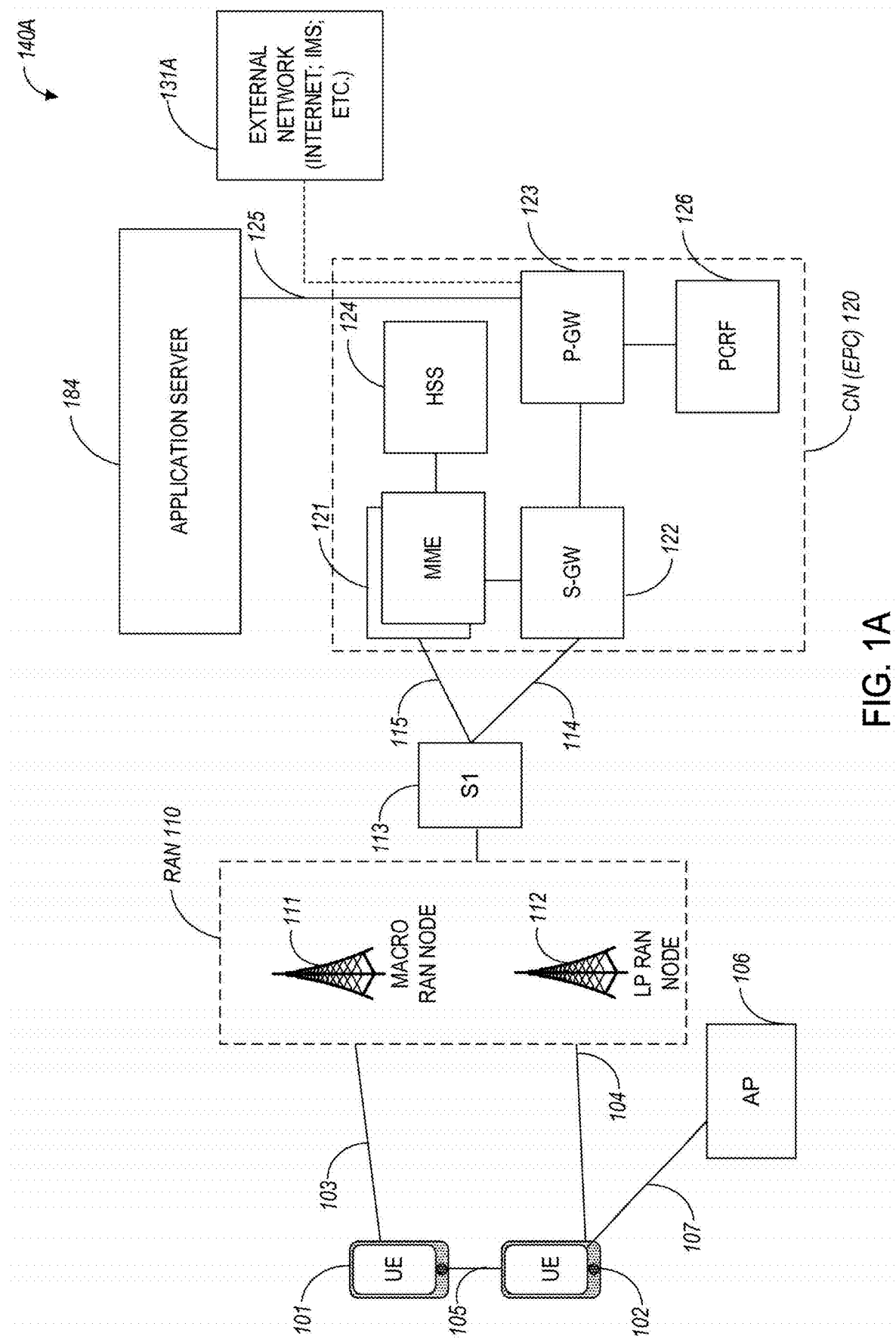
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for operation in a sixth generation (6G) network. In these embodiments, for performing a random access channel (RACH) procedure with a generation node B (gNB), the UE is configured to encode a physical random access channel (PRACH) preamble for transmission in a PRACH occasion (RO). In these embodiments, for carrier frequencies above 52.6 GHz, the UE may determine a Radio Network Temporary Identifier (RNTI) (i.e., either a RA-RNTI or a MsgB-RNTI) based on an index of the PRACH occasion RO index. The UE may also decode a response from the gNB that includes the RNTI. In some embodiments, the UE may determine the RNTI based on the RO index in a time domain and the RO index in a frequency domain. These embodiments are described in more detail below.

In some embodiments, the RNTI may be calculated as follows:

$RNTI = f(t_{TDD,id}, t_{RO,id}, f_{RO,id})$, where $t_{TDD,id}$ is a TDD period index, $t_{RO,id}$ is the PRACH occasion index in time within a TDD period; and $f_{RO,id}$ is PRACH occasion index in the frequency domain.

In some embodiments, for a 4-step RACH procedure, the UE may determine a RA-RNTI. In these embodiments, for a 2-step RACH procedure, the UE may determine a MsgB-RNTI.

In some embodiments, for the carrier frequencies above 52.6 GHz, for the 4-step RACH procedure the RA-RNTI may be calculated as follows:

RA-RNTI=1+t_(RO,id)+256×f_(RO,id), where t_(RO,id) is the index of the PRACH occasion in the time domain (0≤t_(RO,id)<256), f_(RO,id) is the index of the PRACH occasion in the frequency domain (0≤f_(RO,id)<8). In these embodiments, for the carrier frequencies above 52.6 GHz, for the 2-step RACH procedure the MsgB-RNTI may be calculated as follows:

MSGB-RNTI=1+t_(RO,id)+256×f_(RO,id)+256×8, where t_(RO,id) is the index of the PRACH occasion in the time domain (0≤t_(RO,id)<256), f_(RO,id) is the index of the PRACH occasion in the frequency domain (0≤f_(RO,id)<8).

In some embodiments, for the carrier frequencies not above 52.6 GHz, for the 4-step RACH procedure the RA-RNTI may be calculated as follows:

RA-RNTI=1+s_id+14×t_id +14×80×f_id+14×80×8×ul_carrier_id.

In these embodiments, for the carrier frequencies not above 52.6 GHz, for the 2-step RACH procedure the MsgB-RNTI may be calculated as follows:

MSGB-RNTI=1+s_id+14×t_id+14×80×f_id+14×80×8× ul_carrier_id+14×80×8×2, where s_id is an index of a first OFDM symbol of the PRACH occasion (0≤s_id<14), t_id is the index of a first slot of the PRACH occasion in a system frame (0≤t_id<80), where f_id is the index of the PRACH occasion in the frequency domain (0≤f_id<8), and ul_carrier_id is an UL carrier used for Random Access Preamble transmission.

In some embodiments, for the 4-step RACH procedure, the response from the gNB may comprise a Msg2 and a Msg4. In these embodiments, for the two-step RACH, the response from the gNB may comprise a MsgB.

In some embodiments, for the carrier frequencies not above 52.6 GHz, the Msg2 and the Msg4 for the 4-step RACH procedure are not associated with a physical downlink control channel (PDCCH). In some embodiments, for the carrier frequencies not above 52.6 GHz, the MsgB for the 3-step RACH procedure is not associated with the PDCCH.

In some embodiments, a PRACH subcarrier spacing (SCS) is used for transmission of a PRACH preamble, In these embodiments, the PRACH SCS comprises one of a 480 kHz SCS or a 960 kHz SCS, and when a reference SCS is a 60 kHz SCS or a 120 kHz SCS, although the scope of the embodiments is not limited in this respect.

Some embodiments are directed to a non-transitory computer-readable storage medium that stores instructions for execution by processing circuitry of a user equipment (UE) configured for operation in a sixth generation (6G) network. In these embodiments, for performing a random access channel (RACH) procedure with a generation node B (gNB), the processing circuitry may be configured by the instructions to encode a physical random access channel (PRACH) preamble for transmission in a PRACH occasion (RO). For carrier frequencies above 52.6 GHz, the processing circuitry may determine a Radio Network Temporary Identifier (RNTI) (i.e., either a RA-RNTI or a MsgB-RNTI) based on an index of the PRACH occasion RO index. The processing circuitry may also be configured to decode a response from the gNB that includes the RNTI.

Some embodiments are directed to a generation node B (gNB) configured for operation in a sixth generation (6G) network. In these embodiments, for performing a random access channel (RACH) procedure with user equipment (UE), the gNB may decode a physical random access channel (PRACH) preamble received in a PRACH occasion (RO). The gNB may also determine a Radio Network Temporary Identifier (RNTI) (i.e., either a RA-RNTI or a MsgB-RNTI) based on an index of the PRACH occasion RO index for carrier frequencies above 52.6 GHz. The gNB may also encode a response for transmission to the UE that includes the RNTI.

FIG. 1A illustrates an architecture of a network in accordance with some embodiments. The network 140A is shown to include user equipment (UE) 101 and UE 102. The UEs 101 and 102 are illustrated as smartphones handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discoverer Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122. the Packet Data Network (PDN) Gateway (P-GW) 123, and a home subscriber server (HSS) 124. The MMEs 121 may be similar in function to the control plane of legacy Serving General Packet Radio Service (CPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
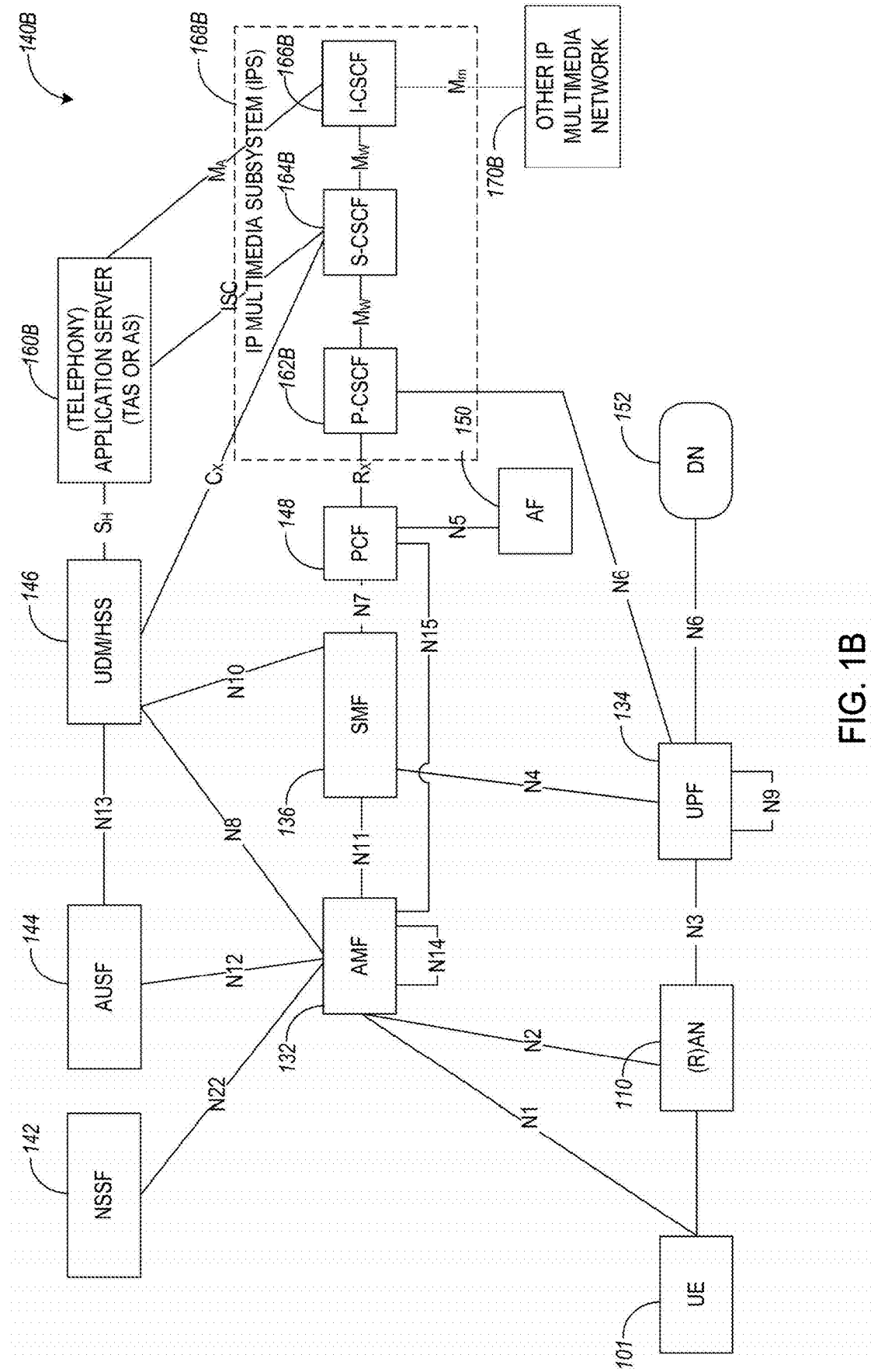
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
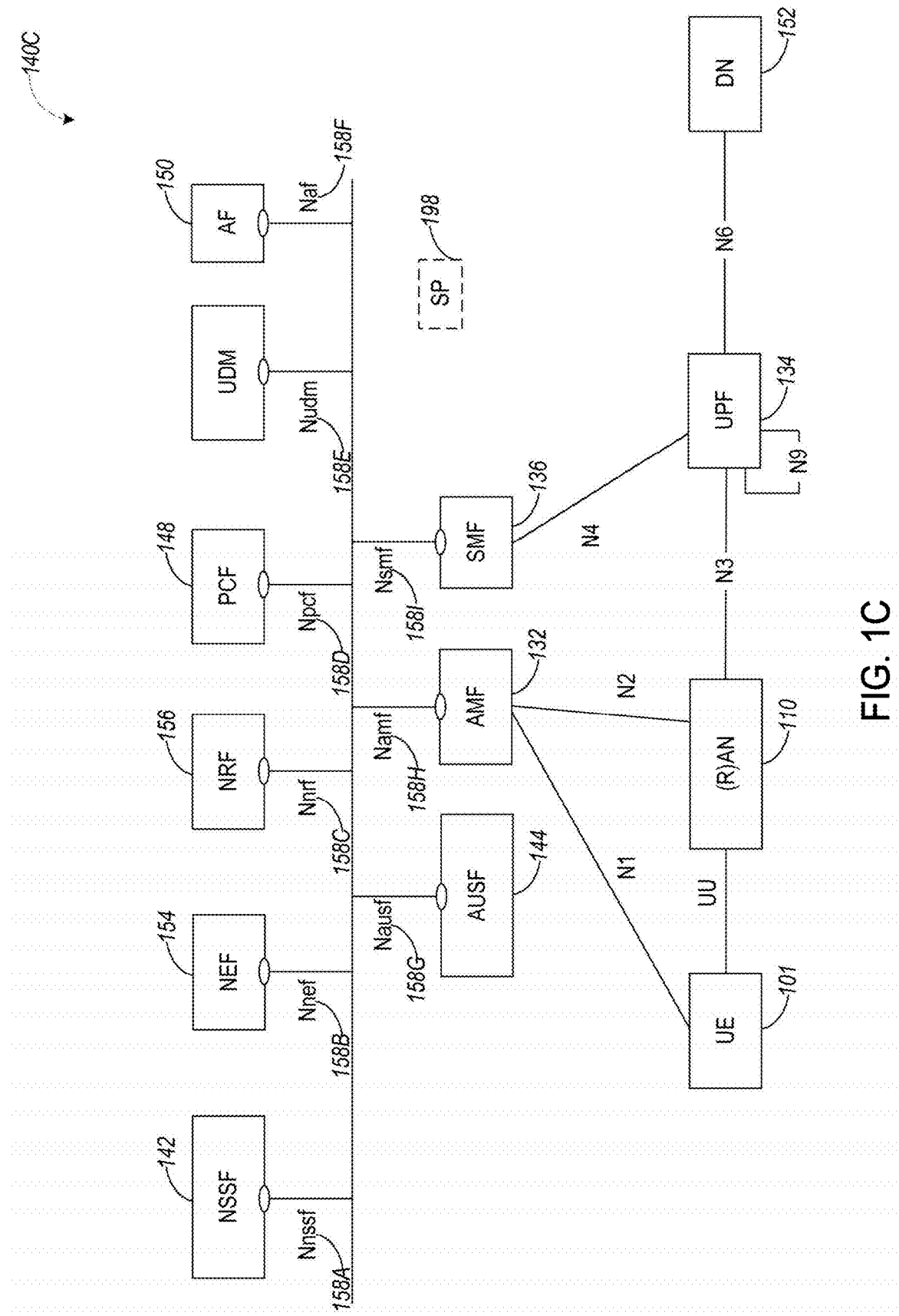

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Figure 2A:
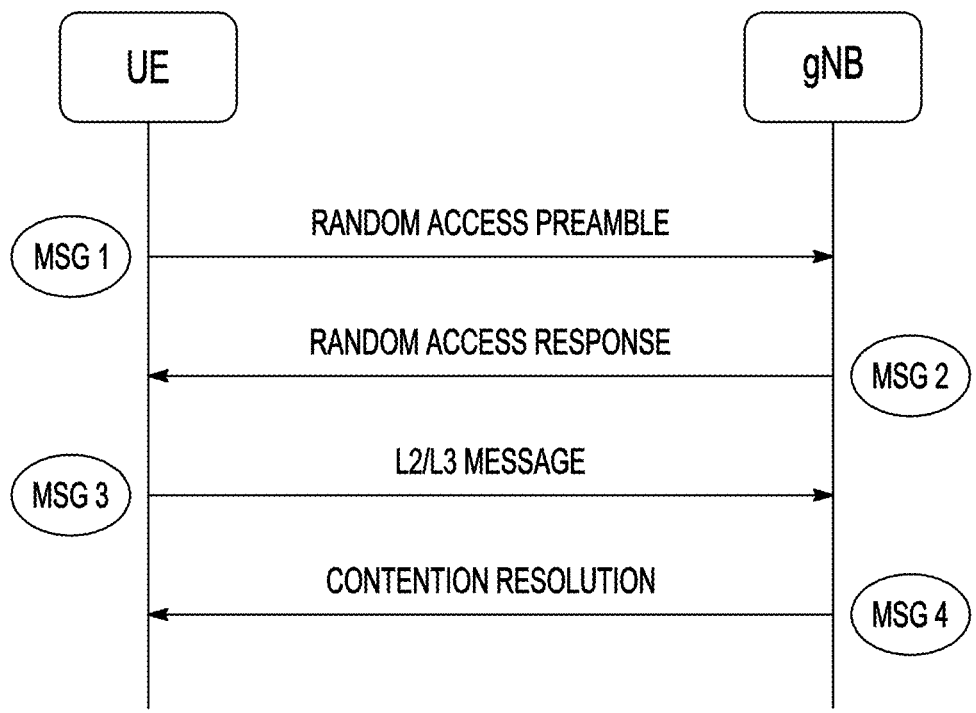
FIG. 2A is a four-step RACH procedure in accordance with some embodiments.

Rel-15 NR, 4-step random access (RACH) procedure was defined. As illustrated in FIG. 2A, in the first step, UE transmits physical random access channel (PRACH) in the uplink by selecting one preamble signature. Subsequently, in the second step, gNB feedbacks the random access response (RAR) which carries timing advanced (TA) command information and uplink grant for the uplink transmission. Further, in the third step, UE transmits Msg3 physical uplink shared channel (PUSCH) which may carry contention resolution ID. In the fourth step, gNB sends the contention resolution message in physical downlink shared channel (PDSCH).

Figure 2B:
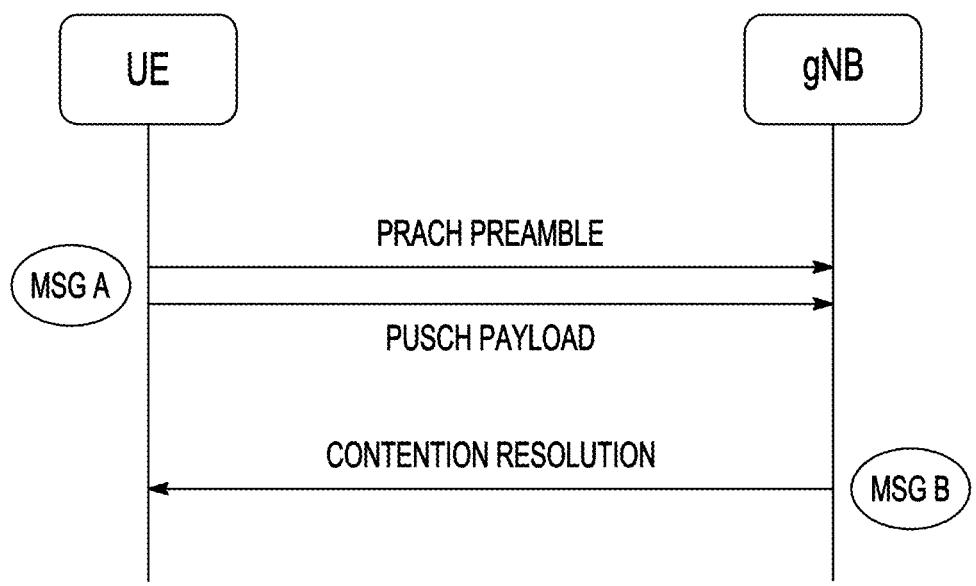
FIG. 2B is a two-step RACH procedure in accordance with some embodiments.

Further, in Rel-16 NR, 2-step RACH procedure was defined, with the motivation to allow fast access and low latency uplink transmission. As illustrated in FIG. 2B, in the first step, UE transmits a PRACH preamble and associated MsgA PUSCH on a configured time and frequency resource, where MsgA PUSCH may carry at least equivalent contents of Msg3 in 4-step RACH. In the second step, after successful detection of PRACH preamble and decoding of MsgA PUSCH, gNB transmits MsgB which may carry equivalent contents of Msg2 and Msg4 in 4-step RACH.

As defined in 4-step RACH, UE monitors physical downlink control channel (PDCCH) with Cyclic Redundancy Error (CRC) scrambled by a Random Access-Radio Network Temporary Identifier (RA-RNTI) in the second step for RAR reception. For system operating above 52.6 GHz carrier frequency or for 6G system, large subcarrier spacing may need to be considered, e.g., 1.92 MHz so as to combat severe phase noise. In this case, number of symbols or slots in 10 ms can be relatively large. If existing RA-RNTI determination mechanism is reused, the maximum value of RA-RNTI can be greater than 16 bit RNTI range. To address this issue, certain mechanism may need to be considered for the determination of RA-RNTI for system operating above 52.6 GHz carrier frequency.

In order to maintain low peak-to-average power ratio (PAPR) property for PDCCH transmission, DFT-s-OFDM waveform can be applied for the transmission of PDCCH. In addition, for system operating above 52.6 GHz carrier frequency or for 6G system, it is expected a narrow beam is used for the transmission of data and control channel. In this case, the number of RAR messages for Msg2 may be limited, which indicates the size of Msg2 can be relatively small. Hence, certain enhancement may be considered for the transmission of Msg2.

Embodiments herein provide enhancements to the random access procedure for system operating above 52.6 GHz carrier frequency. For example, aspects of various embodiments may include:

Determination of RA-RNTI and MsgB-RNTI
Enhancement on transmission of Msg2 and MsgB
Enhancement on SSB pattern in time domain In 3 GPP New Radio (NR) Release (Rel)-15, as defined in 4-step RACH, UE monitors physical downlink control channel (PDCCH) with Cyclic Redundancy Error (CRC) scrambled by a Random Access-Radio Network Temporary Identifier (RA-RNTI) in the second step for RAR reception. Note that the determination of RA-RNTI is described in Section 5.1.3 in 3GPP Technical Standard (TS) 38.321 [1].

The RA-RNTI associated with the PRACH occasion in which the Random Access Preamble is transmitted, is computed as:

$$\text{RA-RNTI} = 1 + s\_id + 14 \times t\_id + 14 \times 80 \times f\_id + 14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ specified in clause 5.3.2 in TS 38.211 [8], f_id is the index of the PRACH occasion in the frequency domain (0≤f_id<8), and ul_carrier_id is the UL carrier used for Random Access Preamble transmission (0 for NUL carrier, and 1 for SUL carrier).

Further, in Rel-16, for 2-step RACH, UE monitors PDCCH with CRC scrambled by a MsgB-RNTI in the second step. Note that the determination of MsgB-RNTI is described in Section 5.1.3a in 3GPP Technical Standard (TS) 38.321 [1].

The MSGB-RNTI associated with the PRACH occasion in which the Random Access Preamble is transmitted, is computed as:

$$\text{MSGB-RNTI} = 1 + s\_id + 14 \times t\_id + 14 \times 80 \times f\_id + 14 \times 80 \times 8 \times ul\_carrier\_id + 14 \times 80 \times 8 \times 2$$

where s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ specified in clause 5.3.2 in TS 38.211 [8], f_id is the index of the PRACH occasion in the frequency domain (0≤f_id<8), and ul_carrier_id is the UL carrier used for Random Access Preamble transmission (0 for NUL carrier, and 1 for SUL carrier). The RA-RNTI is calculated as specified in clause 5.1.3.

Determination of RA-RNTI and MgsB-RNTI

As mentioned above, for system operating above 52.6 GHz carrier frequency or for 6G system, large subcarrier spacing may need to be considered, e.g., 1.92 MHz so as to combat severe phase noise. In this case, number of symbols or slots in 10 ms can be relatively large. If existing RA-RNTI determination mechanism is reused, the maximum value of RA-RNTI can be greater than 16 bit RNTI range. To address this issue, certain mechanism may need to be considered for the determination of RA-RNTI for system operating above 52.6 GHz carrier frequency.

Embodiments of determination of RA-RNTI and MsgB-RNTI a provided as follows:

In one embodiment, RA-RNTI and MsgB-RNTI can be defined as a function of PRACH occasion index in time domain and PRACH occasion index in frequency domain. In particular, RA-RNTI and MsgB-RNTI can be defined as $$\text{RA-RNTI} = f(t_{RO,id}, f_{RO,id})$$

Where $t_{RO,id}$ and $f_{RO,id}$ are PRACH occasion index in time domain and PRACH occasion index in frequency domain, respectively.

More specifically, RA-RNTI can be determined as $$\text{RA-RNTI} = 1 + t_{RO,id} + P_1 \times f_{RO,id}$$

Where P1 is the maximum number of PRACH occasions in time within the configured PRACH occasion periodicity. In one example, P1 may be equal to maximum number of SSB indexes.

For RA-RNTI determination, in one example, the following text in Section 5.1.3 in TS38.321 [1] can be updated as shown below. Note that in the example, it is assumed 256 SSB indexes and the maximum number of PRACH occasions is 256.

The RA-RNTI associated with the PRACH occasion in which the Random Access Preamble is transmitted, is computed as:

$$RA\text{-}RNTI = 1 + t_{RO,id} + 256 \times f_{RO,id}$$

where $t_{RO,id}$ is the index of the PRACH occasion in the time domain ($0 \le t_{RO,id} < 256$), $f_{RO,id}$ is the index of the PRACH occasion in the frequency domain ($0 \le f_{RO,id} < 8$).

For MsgB-RNTI determination, in one example, the following text in Section 5.1.3a in TS38.321 [1] can be updated as shown below.

The MSGB-RNTI associated with the PRACH occasion in which the Random Access Preamble is transmitted, is computed as:

$$MSGB\text{-}RNTI = 1 + t_{RO,id} + 256 \times f_{RO,id} + 256 \times 8$$

where $t_{RO,id}$ is the index of the PRACH occasion in the time domain ($0 \le t_{RO,id} < 256$), $f_{RO,id}$ is the index of the PRACH occasion in the frequency domain ($0 \le f_{RO,id} < 8$).

In another embodiment, RA-RNTI and MsgB-RNTI can be defined as a function of one or more following parameters: TDD period index, symbol index, PRACH occasion in time within a TDD period, and PRACH occasion index in frequency domain.

In one example, RA-RNTI and MsgB-RNTI can be defined as $$RA\text{-}RNTI = f(t_{TDD,id}, t_{RO,id}, f_{RO,id})$$

Where $t_{TDD,id}$ is the TDD period index, $t_{RO,id}$ is PRACH occasion index in time within a TDD period; $f_{RO,id}$ is PRACH occasion index in frequency domain.

More specifically, RA-RNTI can be determined as $$RA\text{-}RNTI = 1 + t_{RO,id} + N_1 \times t_{TDD,id} + N_1 \times N_2 \times f_{RO,id}$$

Where $N_1$ is the maximum number of PRACH occasions in time within a TDD period, $N_2$ is the number of TDD periods within 10 ms frame.

Figure 3:
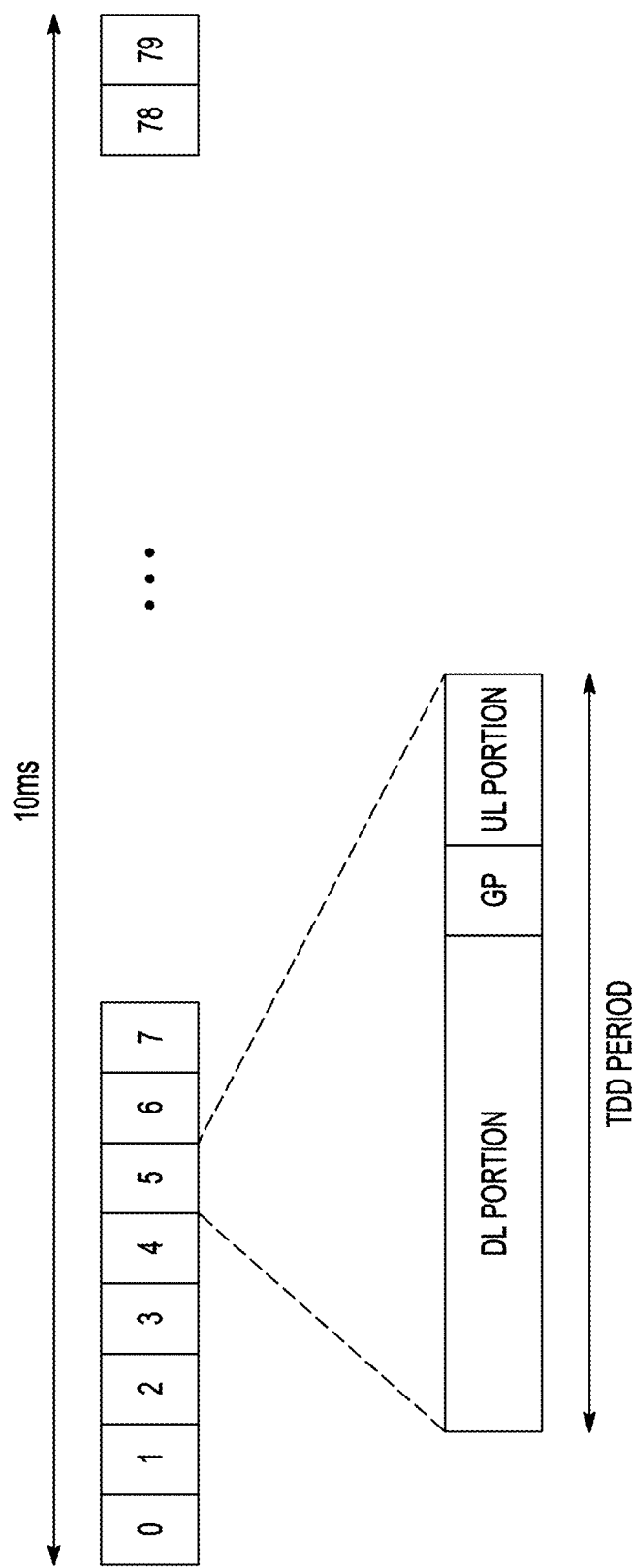
FIG. 3 illustrates time-domain duplexed (TDD) periods within a 10 ms frame in accordance with some embodiments.

Note that TDD periodicity may be configured by higher layers via minimum system information (MSI), remaining minimum system information (RMSI), other system information (OSI) or dedicated radio resource control (RRC) signalling. FIG. 3 illustrates one example of TDD periods within 10 ms frame. In the example, 80 TDD periods can be configured within 10 ms frame, where each TDD period may span ~125 us. Further, within a TDD period, DL portion is allocated at the beginning and UL portion is allocated at the end of TDD period. Guard period (GP) is inserted between DL and UL portion, which can be used to accommodate the DL/UL switching time and round-trip delay. Note that PRACH occasions may be allocated at the end of UL portion within a TDD period.

For RA-RNTI determination, in one example, the following text in Section 5.1.3 in TS38.321 [1] can be updated as shown below.

The RA-RNTI associated with the PRACH occasion in which the Random Access Preamble is transmitted, is computed as:

$$RA\text{-}RNTI = 1 + t_{RO,id} + 8 \times t_{TDD,id} + 8 \times 80 \times f_{RO,id}$$

where $t_{RO,id}$ is the index of the PRACH occasion in the time domain within a TDD period ($0 \le t_{RO,id} < 8$), $t_{TDD,id}$ is the TDD period index within 10 ms frame ($0 \le t_{TDD,id} < 80$) $f_{RO,id}$ is the index of the PRACH occasion in the frequency domain ($0 \le f_{RO,id} < 8$).

For MsgB-RNTI determination, in one example, the following text in Section 5.1.3a in TS38.321 [1] can be updated as shown below.

The MSGB-RNTI associated with the PRACH occasion in which the Random Access Preamble is transmitted, is computed as:

$$MSGB\text{-}RNTI = 1 + t_{RO,id} + 8 \times t_{TDD,id} + 8 \times 80 \times f_{RO,id} + 8 \times 80 \times 8$$

where $t_{RO,id}$ is the index of the PRACH occasion in the time domain within a TDD period ($0 \le t_{RO,id} < 8$), $t_{TDD,id}$ is the TDD period index within 10 ms frame ($0 \le t_{TDD,id} < 80$) $f_{RO,id}$ is the index of the PRACH occasion in the frequency domain ($0 \le f_{RO,id} < 8$).

In another example, RA-RNTI and MsgB-RNTI can be defined as $$RA\text{-}RNTI = f(t_{TDD,id})$$

Where $t_{TDD,id}$ is the TDD period index. That is, for all PRACH preambles that associate with same SSB index, the same RA-RNTI is used to schedule Msg2 or MsgB. More specifically, RA-RNTI can be determined as $$RA\text{-}RNTI = 1 + t_{TDD,id}$$

MSGB-RNTI can be determined as $$MSGB\text{-}RNTI = 1 + t_{TDD,id} + 80$$

$t_{TDD,id}$ is the TDD period index within 10 ms frame ($0 \le t_{TDD,id} < 80$).

Enhancement on Transmission of Msg2 and MsgB

As mentioned above, in order to maintain low peak-tip-average power ratio (PAPR) property for PDCCH transmission, DFT-s-OFDM waveform can be applied for the transmission of PDCCH. In addition, for system operating above 52.6 GHz carrier frequency or for 6G system, it is expected a narrow beam is used for the transmission of data and control channel. In this case, the number of RAR messages for Msg2 may be limited, which indicates the size of Msg2 can be relatively small. Hence, certain enhancement may be considered for the transmission of Msg2.

Embodiments of enhancement on transmission of Msg 2 and MsgB are provided as follows:

In one embodiment, Msg2 and/or MsgB can be transmitted without associated physical downlink control channel (PDCCH). In other words, PDCCH-less based mechanism can be applied for the transmission of Msg2 and/or MsgB. Note that UE needs to monitor PDCCH with Cyclic Redundancy Error (CRC) scrambled by RA-RNTI or MsgB-RNTI for carrying RAR, fallbackRAR and/or successRAR.

Further, RAR, fallbackRAR and/or successRAR may be transmitted as one of downlink control information (DCI) format and can be transmitted in PDCCH, instead of physical downlink shared channel. For the DCI format, a header may be used to indicate whether RAR, fallbackRAR and/or successRAR may be included.

Table 1 illustrates one example of header for the DCI format of which the size is dimensioned to carry a DL grant and a UL grant. In the example, bit "11" is used to indicate that DCI format is used to carry RAR, fallbackRAR and/or successRAR.

TABLE 1

| header for DCI format | |
|---|---|
| Header | Description |
| 00 | Only DL grant (all zeros for UL grant) |
| 01 | Only UL grant (all zeros for DL grant) |

TABLE 1-continued

| header for DCI format | |
| --- | --- |
| Header | Description |
| 10 | DL grant and UL grant |
| 11 | RAR, fallbackRAR and/or successRAR |

In the Table 1, for state '11', this may be used to differentiate whether 1) PDSCH which is scheduled by PDCCH is used to carry Msg2 or MsgB or 2) PDCCH without PDSCH is used to carry Msg2 and MsgB.

As a further extension, state '11' may be used for sounding reference signal (SRS) and/or channel state information—reference signal (CSI-RS) triggering without DL or UL grants.

Note that the size of RAR, fallbackRAR and/or successRAR or the number of RAR, fallbackRAR and/or successRAR messages may be configured by higher layers via RMSI (SIB1), OSI or RRC signalling or indicated in the DCI format. When the size of RAR, fallbackRAR and/or successRAR is less than the size of DCI format, which is predefined in the specification or configured by higher layers via RMSI (SIB1), OSI or RRC signalling, zero padding may be used for RAR, fallbackRAR and/or successRAR in the DCI.

Further, control resource set (CORESET) configuration including time domain resource allocation and frequency domain resource allocation, and search space set configuration for PDCCH carrying RAR, fallbackRAR and/or successRAR may be configured by higher layers via MSI, RMSI (SIB1), OSI or RRC signalling.

Enhancement on SSB Pattern in Time

In one embodiment, one or more synchronization signal block (SSB) can be allocated at the beginning of DL portion of a TDD period. In other words, PDCCH monitoring occasions may be configured after the SSB within the same DL portion.

In case when more than one SSBs are allocated within a TDD period, some gaps, e.g., K symbols may be reserved to allow adequate beam switching time. Note that K is predefined in the specification, e.g., K=1 or 2.

In another option, when two SSBs are allocated within a TDD period, a first SSB is allocated at the beginning of TDD period while a second SSB is allocated at the end of TDD period.

Figure 4:
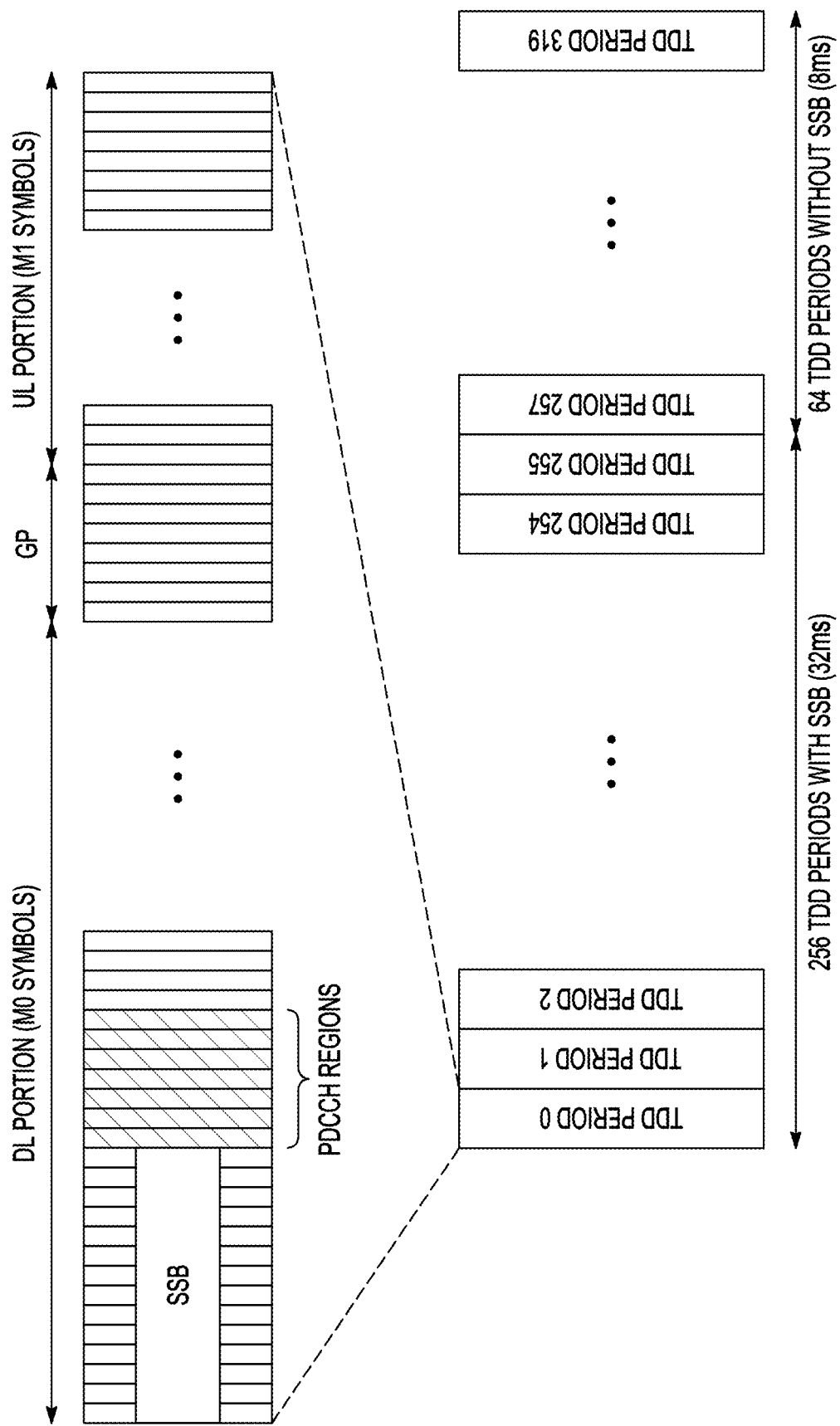
FIG. 4 illustrates a synchronization signal block (SSB) pattern in the time domain, in accordance with some embodiments.

FIG. 4 illustrates one example of SSB pattern in time domain. In the example, 256 SSBs are allocated within 40 ms SSB periodicity. One SSB is allocated within a TDD period for first 32 ms within 40 ms SSB periodicity. Further, SSB is allocated at the beginning of DL portion of a TDD period. PDCCH regions may be allocated after SSB.

In one embodiment, one synchronization signal block (SSB) can be allocated from the $n^{th}$ symbol in DL portion of a TDD period and the value n is indicated in the content of PBCH. The first n symbols serve as PDCCH region. For example, CORESET 0 is allocated in the first n symbols. There may exist other SSB(s) or other CORESET(s) that is allocated in the same TDD period. With this method, if UE doesn't need to receive an SSB, after reception of the first n symbols in a TDD period, the UE may skip buffeting the symbols corresponding to the SSB for power saving.

Figure 5:
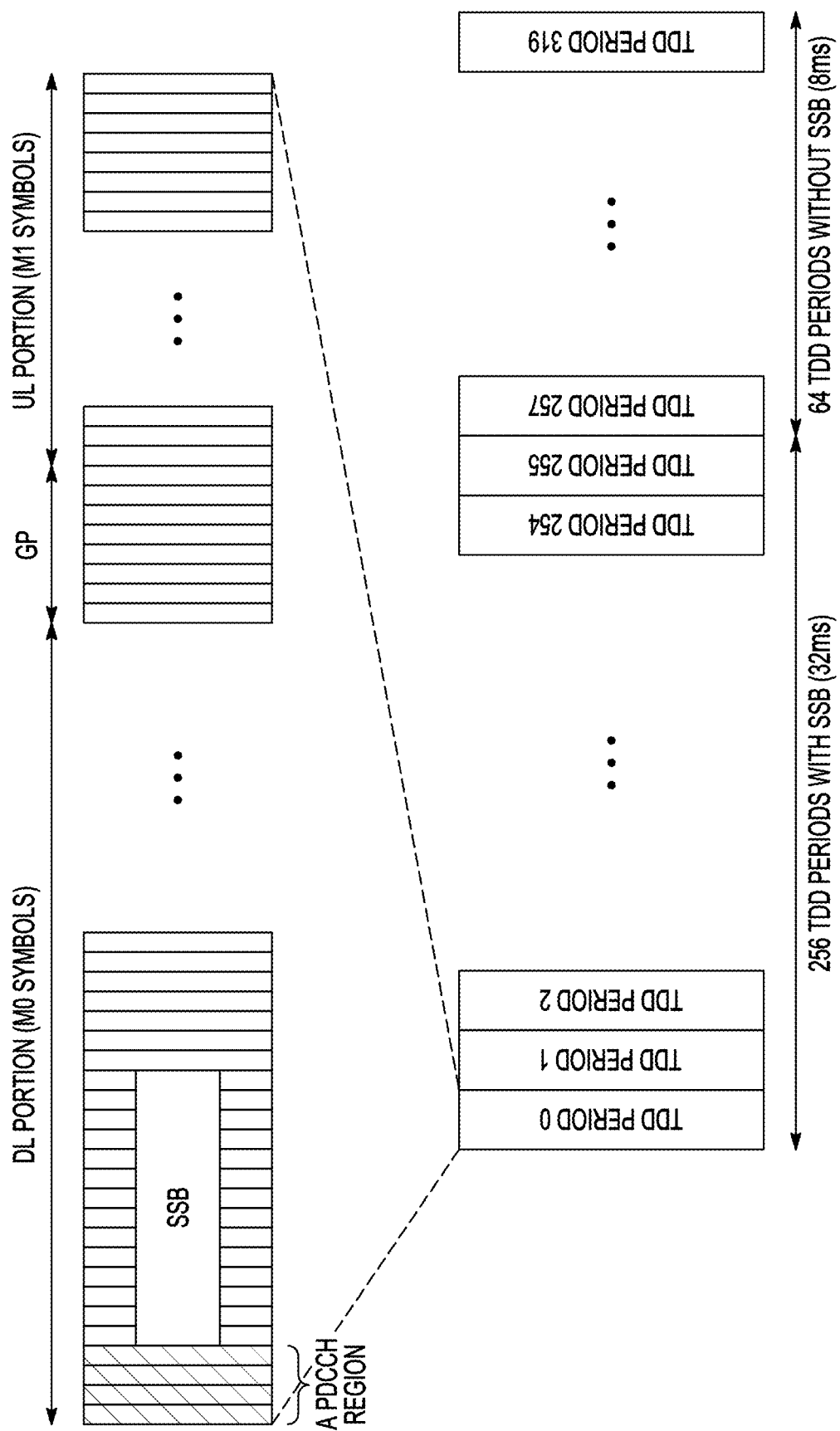
FIG. 5 illustrates a SSB pattern in the time domain, in accordance with some other embodiments.

FIG. 5 illustrates one example of SSB pattern in time domain. In the example, 256 SSBs are allocated within 40 ms SSB periodicity. One SSB is allocated within a TDD period for first 32 ms within 40 ms SSB periodicity. Further, SSB is allocated from the $4^{th}$ symbol of a TDD period. The first 4 symbols are used as PDCCH regions.

Figure 6:
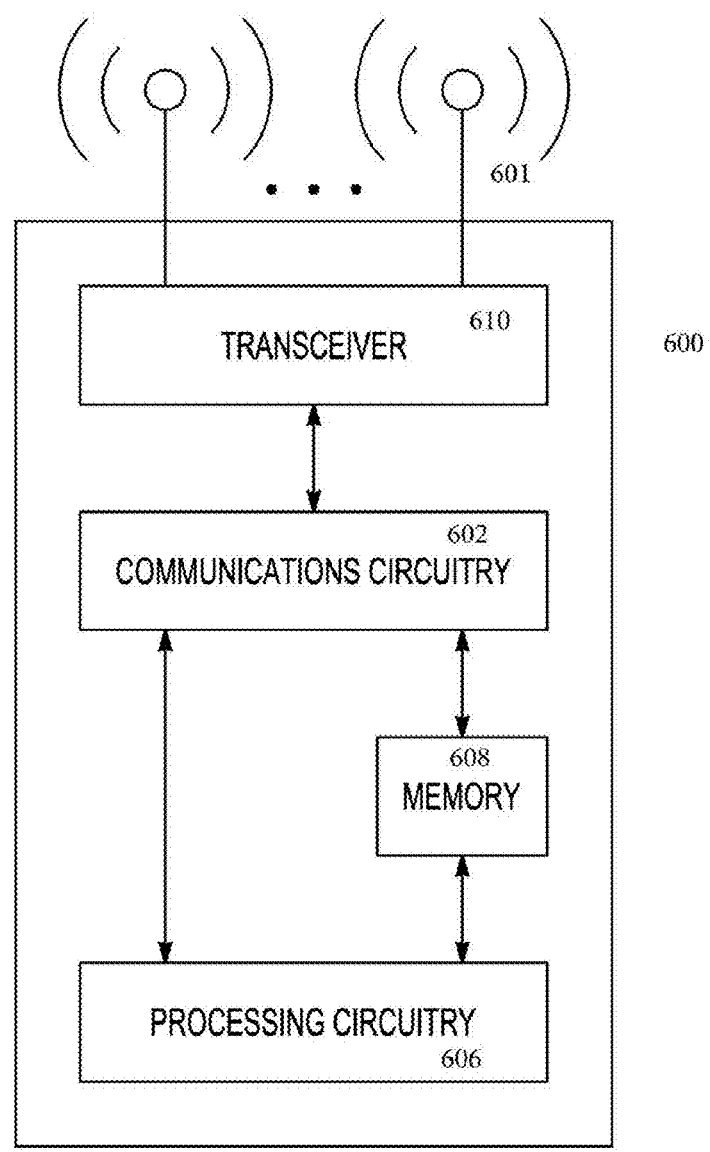
FIG. 6 illustrates a functional block diagram of a wireless communication device in accordance with some embodiments.

FIG. 6 illustrates a functional block diagram of a wireless communication device, in accordance with some embodiments. Wireless communication device 600 may be suitable for use as a UE or gNB configured for operation in a 5G NR network. The communication device 600 may include communications circuitry 602 and a transceiver 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 600 may include one or more of a keyboard, a display, a non-volatile memory port, multiple antennas, a graphics processor, an application processor, speakers, and other mobile device elements. The display may be an LCD screen including a touch screen.

Although the communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 600 may refer to one or more processes operating on one or more processing elements.

EXAMPLES

Example 1 may include a method of wireless communication for a fifth generation (5G) or new radio (NR) system, the method comprising: Transmitting, by UE, a physical random access channel (PRACH) preamble; Determining, by UE, a random access-Radio Network Temporary Identifier (RA-RNTI); and Monitoring, by UE, a physical downlink control channel (PDCCH) with Cyclic Redundancy Error (CRC) scrambled by RA-RNTI which carries Msg2.

Example 2 may include the method of example 1 or some other example herein, wherein RA-RNTI and MsgB-RNTI can be defined as a function of PRACH occasion index in time domain and PRACH occasion index in frequency domain.

Example 3 may include the method of example 1 or some other example herein, wherein RA-RNTI and MsgB-RNTI can be defined as $$\text{RA-RNTI}=f(t_{RO,id},f_{RO,id})$$

Where $t_{RO,id}$ and $f_{RO,id}$ are PRACH occasion index in time domain and PRACH occasion index in frequency domain, respectively.

Example 4 may include the method of example 1 or some other example herein, wherein RA-RNTI and MsgB-RNTI can be defined as a function of one or more following parameters: TDD period index, symbol index, PRACH occasion in time within a TDD period, and PRACH occasion index in frequency domain.

Example 5 may include the method of example 1 or some other example herein, wherein RA-RNTI and MsgB-RNTI can be defined as $$\text{RA-RNTI}=f(t_{TDD,id},t_{RO,id},f_{RO,id})$$

Where $t_{TDD,id}$ is the TDD period index, $t_{RO,id}$ is PRACH occasion index in time within a TDD period; $f_{RO,id}$ is PRACH occasion index in frequency domain.

Example 6 may include the method of example 1 or some other example herein, wherein Msg2 and/or MsgB can be transmitted without associated physical downlink control channel (PDCCH)

Example 7 may include the method of example 1 or some other example herein, wherein RAR, fallbackRAR and/or successRAR may be transmitted as one of downlink control information (DCI) format and can be transmitted in PDCCH Example 8 may include the method of example 1 or some other example herein, wherein a header may be used to indicate whether RAR, fallbackRAR and/or successRAR may be included.

Example 9 may include the method of example 1 or some other example herein, wherein one state in the header may be used for sounding reference signal (SRS) and/or channel state information—reference signal (CSI-RS) triggering without DL or UL grants.

Example 10 may include the method of example 1 or some other example herein, wherein the size of RAR, fallbackRAR and/or successRAR or the number of RAR, fallbackRAR and/or successRAR messages may be configured by higher layers via RMSI (SIB1), OSI or RRC signalling or indicated in the DCI format Example 11 may include the method of example 1 or some other example herein, wherein control resource set (CORESET) configuration including time domain resource allocation and frequency domain resource allocation, and search space set configuration for PDCCH carrying RAR, fallbackRAR and/or successRAR may be configured by higher layers via MSI, RMSI (SIB1), OSI or RRC signalling.

Example 12 may include the method of example 1 or some other example herein, wherein one or more synchronization signal block (SSB) can be allocated at the beginning of DL portion of a TDD period.

Example 13 may include the method of example 1 or some other example herein, wherein when more than one SSBs are allocated within a TDD period, some gaps, e.g., K symbols may be reserved to allow adequate beam switching time.

Example 14 may include the method of example 1 or some other example herein, wherein one synchronization signal block (SSB) can be allocated from the nth symbol in DL portion of a TDD period and the value n is indicated in the content of PBCH, wherein the first n symbols serve as PDCCH region.

Example 15 may include a method of a UE, the method comprising:
encoding a physical random access channel (PRACH) preamble for transmission;
determining a random access—Radio Network Temporary Identifier (RA-RNTI); and
monitoring for a physical downlink control channel (PDCCH) with Cyclic Redundancy Check (CRC) scrambled by the RA-RNTI, wherein the PDCCH includes a Msg2 or a MsgB.

Example 16 may include the method of example 15 or some other example herein, wherein the RA-RNTI is defined as a function of a PRACH occasion index in time domain and a PRACH occasion index in frequency domain.

Example 17 may include the method of example 15-16 or some other example herein, wherein the RA-RNTI is defined as:

$$\text{RA-RNTI}=f(t_{RO,id},f_{RO,id})$$

wherein $t_{RO,id}$ and $f_{RO,id}$ are PRACH occasion index in time domain and PRACH occasion index in frequency domain, respectively.

Example 18 may include the method of example 15 or some other example herein, wherein the RA-RNTI is defined as a function of one or more of: a TDD period index, a symbol index, a PRACH occasion in time within a time-domain duplexing (TDD) period, and/or a PRACH occasion index in frequency domain.

Example 19 may include the method of example 15, 18, or some other example herein, wherein the RA-RNTI is defined as:

$$RA\text{-}RNTI = f(t_{TDD,id}, t_{RO,id}, f_{RO,id})$$

wherein $t_{TDD,id}$ is a TDD period index, $t_{RO,id}$ is a PRACH occasion index in time within a TDD period; $f_{RO,id}$ is a PRACH occasion index in frequency domain.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for operation in a sixth generation (6G) network, the apparatus comprising:
   processing circuitry; and memory,
      wherein for performing a random access channel (RACH) procedure with a generation node B (gNB), the processing circuitry is to:
      encode a physical random access channel (PRACH) preamble for transmission in a PRACH occasion (RO);
      determine a Radio Network Temporary Identifier (RNTI) based on an index of the PRACH occasion RO index, the RNTI being one of an RA-RNTI and a MsgB-RNTI; and
      decode a response from the gNB that includes the RNTI,
      wherein for carrier frequencies above 52.6 GHz, the processing circuitry is configured to determine the RNTI using a TDD period index ($t_{TDD,id}$),
      wherein for carrier frequencies that are not above 52.6 GHz, the processing circuitry is configured to determine the RNTI without use of the TDD period index, and
      wherein the memory is configured to store the RNTI.

2. The apparatus of claim 1, wherein for the carrier frequencies above 52.6 GHz, the processing circuitry is configured to determine the RNTI based on the TDD period index ($t_{TDD,id}$), a PRACH occasion index in time within a TDD period ($t_{RO,id}$), and a PRACH occasion index in a frequency domain ($f_{RO,id}$), and
   wherein for the carrier frequencies that are not above 52.6 GHz, the processing circuitry is configured to determine the RNTI based on an index of a first OFDM symbol of the PRACH occasion (s_id), an index of a first slot of the PRACH occasion in a system frame (t_id), an index of the PRACH occasion in the frequency domain (f_id), and an UL carrier used for Random Access Preamble transmission (ul_carrier_id).

3. The apparatus of claim 2, wherein for the carrier frequencies above 52.6 GHz, the RNTI is calculated as follows:

$$RNTI = f(t_{TDD,id}, t_{RO,id}, f_{RO,id})$$

where $t_{TDD,id}$ is the TDD period index, $t_{RO,id}$ is the PRACH occasion index in time within a TDD period; and $f_{RO,id}$ is the PRACH occasion index in the frequency domain.

4. The apparatus of claim 2, wherein for a 4-step RACH procedure, the processing circuitry is configured to determine a RA-RNTI, and wherein for a 2-step RACH procedure, the processing circuitry is configured to determine a MsgB-RNTI.

5. The apparatus of claim 4, wherein for the carrier frequencies not above 52.6 GHz, for the 4-step RACH procedure the RA-RNTI is calculated as follows:

$$RA\text{-}RNTI = 1 + s\_id + 14 \times t\_id + 14 \times 80 \times f\_id + 14 \times 80 \times 8 \times ul\_carrier\_id, \text{ and}$$

wherein for the carrier frequencies not above 52.6 GHz, for the 2-step RACH procedure the MsgB-RNTI is calculated as follows:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2,$$

where s_id is an index of a first OFDM symbol of the PRACH occasion (0≤s_id<14), t_id is the index of a first slot of the PRACH occasion in a system frame (0≤t_id<80), where f_id is the index of the PRACH occasion in the frequency domain (0≤f_id<8), and ul_carrier_id is an UL carrier used for Random Access Preamble transmission.

6. The apparatus of claim 4, wherein for the 4-step RACH procedure, the response from the gNB comprises a Msg2 and a Msg4, and
   wherein for the 2-step RACH the response from the gNB comprises a MsgB.

7. The apparatus of claim 6, wherein for the carrier frequencies not above 52.6 GHz:
   the Msg2 and the Msg4 for the 4-step RACH procedure are not associated with a physical downlink control channel (PDCCH), and
   the MsgB for the 2-step RACH procedure is not associated with the PDCCH.

8. The apparatus of claim 4, wherein a PRACH subcarrier spacing (SCS) is used for transmission of a PRACH preamble, wherein the PRACH SCS comprises one of a 480 kHz SCS or a 960 kHz SCS, and when a reference SCS is a 60 kHz SCS or a 120 kHz SCS.

9. A non-transitory computer-readable storage medium that stores instructions for execution by processing circuitry of a user equipment (UE) configured for operation in a sixth generation (6G) network, wherein for performing a random access channel (RACH) procedure with a generation node B (gNB), the processing circuitry is to:
   encode a physical random access channel (PRACH) preamble for transmission in a PRACH occasion (RO);
   determine a Radio Network Temporary Identifier (RNTI), the RNTI being one of an RA-RNTI and a MsgB-RNTI; and
   decode a response from the gNB that includes the RNTI,
   wherein for carrier frequencies above 52.6 GHz, the processing circuitry is configured to determine the RNTI using a TDD period index ($t_{TDD,id}$), and
   wherein for carrier frequencies that are not above 52.6 GHz, the processing circuitry is configured to determine the RNTI without use of the TDD period index.

10. The non-transitory computer-readable storage medium of claim 9, wherein for the carrier frequencies above 52.6 GHz, the processing circuitry is configured to determine the RNTI based on the TDD period index ($t_{TDD,id}$), a PRACH occasion index in time within a TDD period ($t_{RO,id}$), and a PRACH occasion index in a frequency domain ($f_{RO,id}$), and
   wherein for the carrier frequencies that are not above 52.6 GHz, the processing circuitry is configured to determine the RNTI based on an index of a first OFDM symbol of the PRACH occasion (s_id), an index of a first slot of the PRACH occasion in a system frame (t_id), an index of the PRACH occasion in the frequency domain (f_id), and an UL carrier used for Random Access Preamble transmission (ul_carrier_id).

11. The non-transitory computer-readable storage medium of claim 10, wherein for the carrier frequencies above 52.6 GHz, the RNTI is calculated as follows:

$$RNTI=f(t_{TDD,id}, t_{RO,id}, f_{RO,id}),$$

where $t_{TDD,id}$ is the TDD period index, $t_{RO,id}$ is the PRACH occasion index in time within a TDD period; and $f_{RO,id}$ is the PRACH occasion index in the frequency domain.

12. The non-transitory computer-readable storage medium of claim 10, wherein for a 4-step RACH procedure, the processing circuitry is configured to determine a RA-RNTI, and wherein for a 2-step RACH procedure, the processing circuitry is configured to determine a MsgB-RNTI.

13. An apparatus of a generation node B (gNB) configured for operation in a sixth generation (6G) network, the apparatus comprising: processing circuitry; and memory,
wherein for performing a random access channel (RACH) procedure with user equipment (UE), the processing circuitry is to:
decode a physical random access channel (PRACH) preamble received in a PRACH occasion (RO);
determine a Radio Network Temporary Identifier (RNTI), the RNTI being one of an RA-RNTI and a MSgB-RNTI; and
encode a response for transmission to the UE that includes the RNTI,
wherein for carrier frequencies above 52.6 GHz, the processing circuitry is configured to determine the RNTI using a TDD period index ($t_{TDD,id}$), and
wherein for carrier frequencies that are not above 52.6 GHz, the processing circuitry is configured to determine the RNTI without use of the TDD period index,
wherein the memory is configured to store the RNTI.

14. The apparatus of claim 13, wherein for the carrier frequencies above 52.6 GHz, the processing circuitry is configured to determine the RNTI based on the TDD period index ($t_{TDD,id}$), a PRACH occasion index in time within a TDD period ($t_{RO,id}$), and a PRACH occasion index in a frequency domain ($f_{RO,id}$), and
wherein for the carrier frequencies that are not above 52.6 GHz, the processing circuitry is configured to determine the RNTI based on an index of a first OFDM symbol of the PRACH occasion (s_id), an index of a first slot of the PRACH occasion in a system frame (t_id), an index of the PRACH occasion in the frequency domain (f_id), and an UL carrier used for Random Access Preamble transmission (ul_carrier_id).

15. The apparatus of claim 14, wherein for a 4-step RACH procedure, the processing circuitry is configured to determine a RA-RNTI, and wherein for a 2-step RACH procedure, the processing circuitry is configured to determine a MsgB-RNTI.

* * * * *